(12) United States Patent
Matsuda

(10) Patent No.: US 6,764,361 B1
(45) Date of Patent: Jul. 20, 2004

(54) PERSONAL WATERCRAFT

(75) Inventor: Yoshimoto Matsuda, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/263,425

(22) Filed: Oct. 1, 2002

(30) Foreign Application Priority Data

Oct. 4, 2001 (JP) ..................................... 2001-308286

(51) Int. Cl.$^7$ ............................................. B63H 21/32
(52) U.S. Cl. ................................................... 440/89 B
(58) Field of Search ............................ 440/89 R, 89 B, 440/89 C, 89 E, 89 F, 89 J

(56) References Cited

U.S. PATENT DOCUMENTS 5,109,668 A * 5/1992 Lindstedt ..................... 60/310
6,030,263 A * 2/2000 Uchino et al. ............ 440/89 R

* cited by examiner

Primary Examiner—Jesus D. Sotelo
(74) Attorney, Agent, or Firm—Kolisch Hartwell, P.C.

(57) ABSTRACT

Disclosed is a personal watercraft capable of obtaining a high horsepower in a high engine speed even when a four-cycle engine is mounted in the personal watercraft limited in length. The personal watercraft adapted to eject water from an outlet port to be propelled as the resulting reaction, comprises: a multi-cylinder four-cycle engine contained in an engine room and having even cylinders of four or more cylinders; a water jet pump being driven by the engine, for pressuring and accelerating the water; primary collecting exhaust passages, each of which is configured to collect two exhaust passages respectively connected to exhaust ports of two cylinders of the engine into one exhaust passage; and a secondary collecting exhaust passage configured to collect the primary collecting passages.

11 Claims, 9 Drawing Sheets

PERSONAL WATERCRAFT

BACKGROUND OF THE INVENTION

1. Field of the Invention

The present invention relates to a personal watercraft (PWC) which ejects water rearward and planes on a water surface as the resulting reaction. More particularly, the present invention relates to a personal watercraft having a characteristic exhaust system.

2. Description of the Related Art

In recent years, so-called jet-propulsion personal watercraft have been widely used in leisure, sport, rescue activities, and the like. The jet-propulsion personal watercraft is configured to have a water jet pump that pressurizes and accelerates water sucked from a water intake generally provided on a bottom of a hull and ejects it rearward from an outlet port. Thereby, the personal watercraft is propelled.

In the jet-propulsion personal watercraft, a steering nozzle provided behind the outlet port of the water jet pump is swung either to the right or to the left, to change the ejection direction of the water to the right or to the left, thereby turning the watercraft to the right or to the left.

In the personal watercraft, an engine is contained in an engine room located substantially at the center portion of the watercraft in the longitudinal direction and surrounded by a deck and a hull. As the engine, a two-cycle internal combustion engine (two-cycle engine) that is small and lightweight and is capable of generating a high power is employed. Recently, the use of a four-cycle internal combustion engine (four-cycle engine) has been contemplated.

When the four-cycle engine is accommodated in the engine room for the two-cycle engine and is required to have a horsepower as high as that of the two-cycle engine, a horsepower per displacement of the engine needs to be increased in the four-cycle engine.

In the four-cycle engine, it is necessary to extend an exhaust passage in order to obtain the high horsepower. Nevertheless, since the personal watercraft is short in total length and the engine is mounted at the center portion of the watercraft, it is hard to extend the exhaust passage to such an extent that the high horsepower can be obtained in the four-cycle engine.

SUMMARY OF THE INVENTION

The present invention addresses the above-described problem, and an object of the present invention is to provide a personal watercraft capable of obtaining a high horsepower when a four-cycle engine is mounted in the personal watercraft limited in total length.

According to a first aspect of the present invention, there is provided a personal watercraft adapted to eject water from an outlet port and to be propelled as the resulting reaction, comprising: a multi-cylinder four-cycle engine contained in an engine room of the watercraft and having even cylinders of four or more cylinders; a water jet pump being driven by the engine, for pressuring and accelerating the water; exhaust passages respectively connected to exhaust ports of the engine; primary collecting exhaust passages each of which is configured to collect two exhaust passages into one passage; and a secondary collecting exhaust passage configured to collect the primary collecting exhaust passages.

In the personal watercraft so constituted, all the exhaust passages can be efficiently collected in the relatively small engine room in such a manner that two exhaust passages are collected into the primary collecting exhaust passage, and then, the primary collecting exhaust passages are collected into the secondary collecting exhaust passage. With such a structure, by utilizing exhaust inertia, exhaust efficiency is increased regardless of the limited length of an exhaust path. In addition, the exhaust system can be simply and efficiently structured. The secondary collecting exhaust passage may be a collecting exhaust passage obtained by extending the primary collecting exhaust passage into one passage, or otherwise a muffler.

Preferably, two exhaust passages connected to cylinders ignited at successive timings may be collected into one primary collecting exhaust passage.

Preferably, an inlet port may be provided at a rear end portion of the exhaust passage or a front end portion of the primary collecting exhaust passage, for introducing water to an inside of the primary collecting exhaust passage. This makes it possible that the temperature of the exhaust gas flowing through the inside of the primary collecting exhaust passage can be lowered. As a result, the actual primary collecting exhaust passage achieves an effect normally provided by a longer primary collecting exhaust passage. This structure is advantageous to the personal watercraft that is short in total length and is configured to have an engine mounted substantially at the center portion of the watercraft.

Preferably, the secondary collecting exhaust passage may be configured to accommodate at least an extended rear end portion of the primary collecting exhaust passage.

In the structure, since the two exhaust passages of the engine are collected into each primary collecting exhaust passage, and at least a rear end portion of the primary collecting exhaust passage is extended to be accommodated in the secondary collecting exhaust passage, the primary collecting exhaust passage can be extended even in the engine room that is limited in space. This structure is advantageous to the personal watercraft that is short in total length and is configured to have the engine mounted substantially at the center portion of the watercraft.

Preferably, the engine may be a four-cylinder engine, the exhaust passage may be an exhaust manifold through which an exhaust gas from the exhaust port of each cylinder flows to the primary collecting exhaust passage, the primary collecting exhaust passage may be comprised of a primary collecting exhaust pipe, and the secondary collecting exhaust passage may be a muffler comprising at least one expansion chamber.

Preferably, two primary collecting exhaust pipes may have semi-circular cross-sections which are joined to have a circular cross-section. This structure is suitable for the relatively small engine room. Further, a penetrating hole through which the joined primary collecting exhaust pipe is introduced into the muffler is a circular hole which is easy to process. Further, when a water jacket of a double-pipe shape is provided at the outer periphery of the primary collecting exhaust pipe to attain a water-cooling structure, an outer casing of the water jacket that is cylindrical and easy to process can be attained.

Preferably, the two primary collecting exhaust pipes may constitute one pipe having two independent passages defined by a separating plate having a curvature in cross-section. The separating plate can absorb thermal distortion caused by thermal change by changing the curvature.

Preferably, the muffler may be a water muffler in which the exhaust gas containing supplied cooling water flows. This offers higher muffling effect in the personal watercraft.

According to a second aspect of the present invention, there is provided a small boat propelled by a multi-cylinder four-cycle engine disposed in an engine room of the boat, comprising: a plurality of exhaust passages respectively connected to exhaust ports of the engine; at least two collecting exhaust passages, each of which is configured to collect the plurality of exhaust passages, the collecting exhaust passages being integral with each other and defined by a separating plate; and an inlet port provided at a rear end portion of the exhaust passage or at a front end portion of the collecting passage, for introducing water to an inside of the collecting exhaust passage.

In accordance with the small boat so constituted, when the primary collecting exhaust passage is comprised of one pipe having two independent passages defined by the separating plate, the exhaust gas and the separating plate which is subjected to increased thermal load are cooled by the water introduced through the inlet port, so that thermal load is reduced. As a matter of course, the present invention is applicable to personal watercrafts which are one type of the small boat.

Preferably, the inlet port may be provided to allow water to be supplied to the separating plate through the inlet port. Thereby, since the separating plate is positively cooled, the heat load acting on the separating plate can be further reduced.

Preferably, the separating plate may be provided so as to form an angle with respect to a horizontal line in a steady state of the small boat. This makes it possible for water to be supplied to the separating plate through the inlet port regardless of the direction in which the inlet port is opened. More preferably, the separating plate is provided vertically.

The above and further objects and features of the invention will be more fully be apparent from the following detailed description with accompanying drawings.

DETAILED DESCRIPTION OF THE PREFERRED EMBODIMENTS

Hereinafter, a personal watercraft, which is one type of a small boat according to an embodiment of the present invention, will be described with reference to the accompanying drawings.

Figure 8:
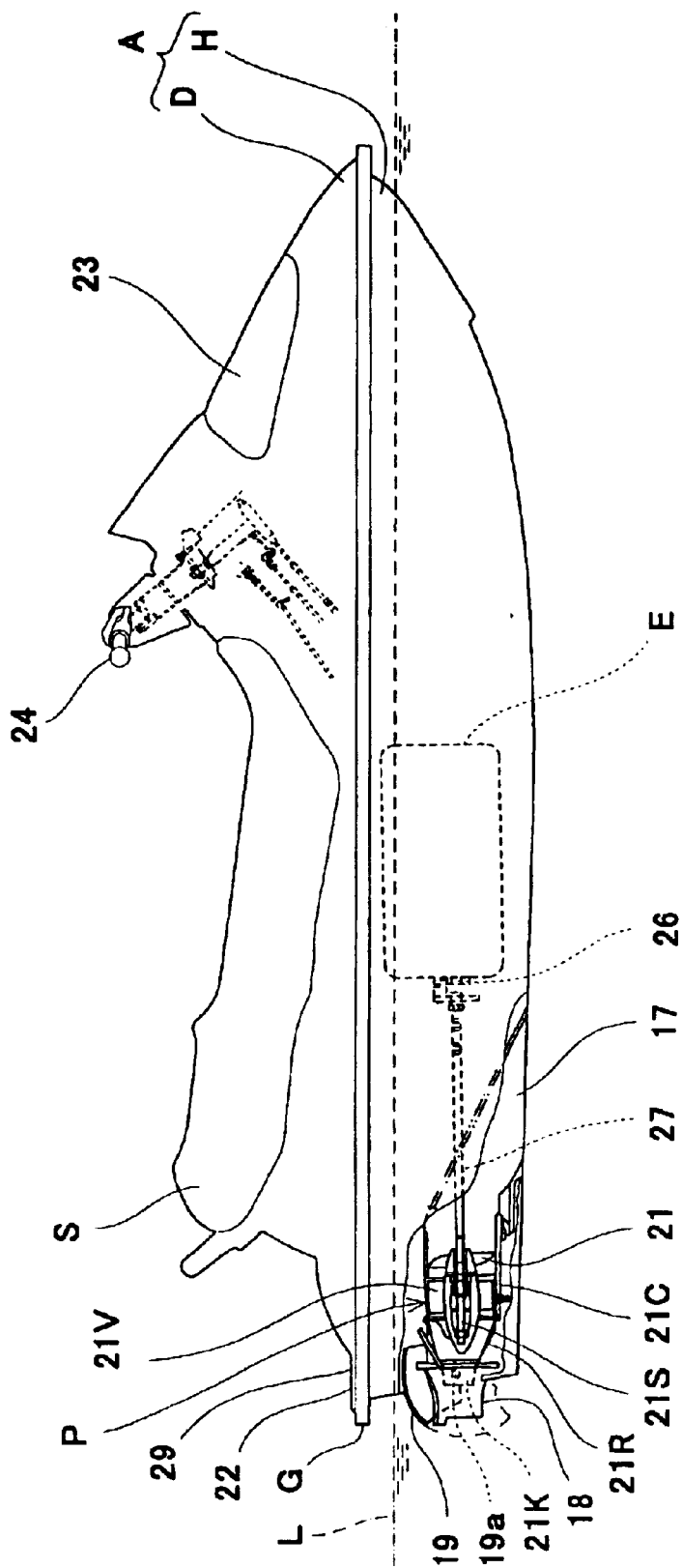
FIG. 8 is a side view showing an entire jet-propulsion personal watercraft according to the embodiment of the present invention.
Figure 9:
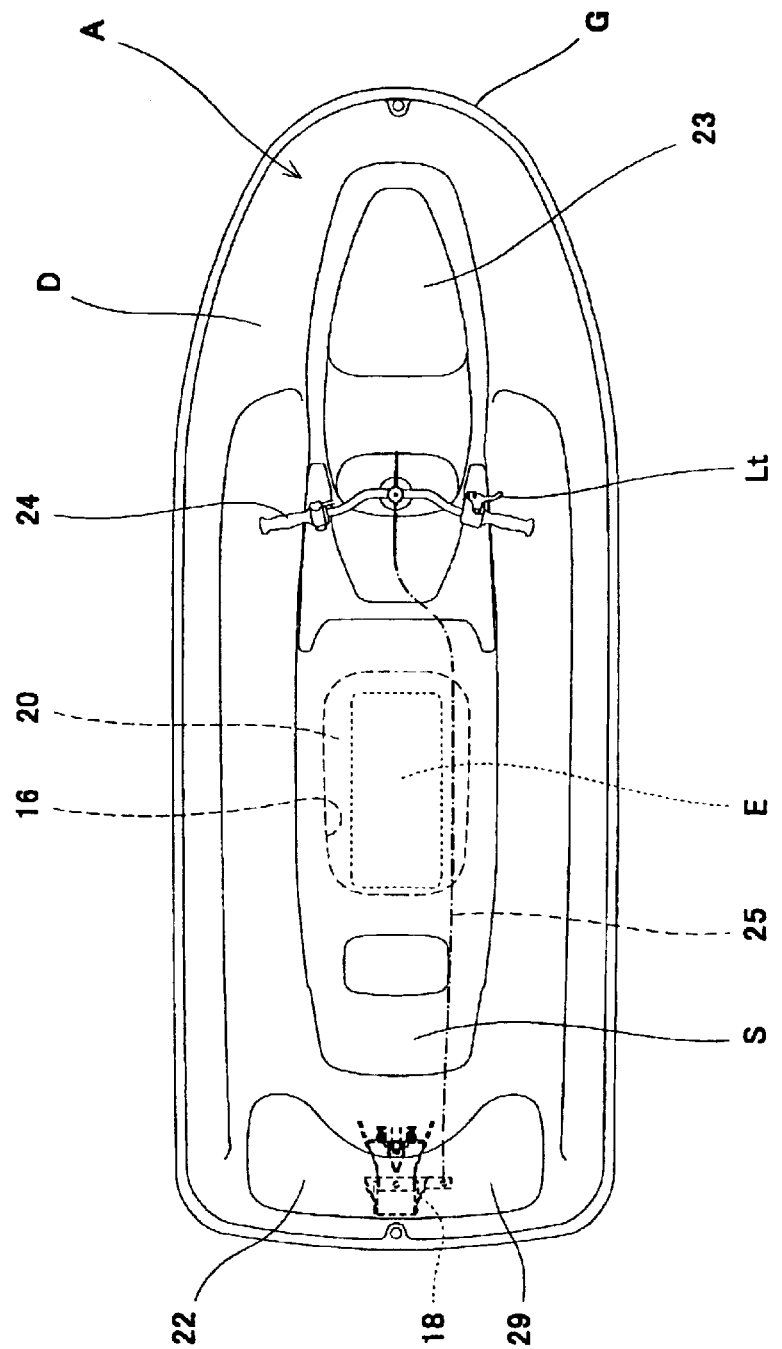
FIG. 9 is a plan view showing the entire personal watercraft in FIG. 8.

Referring now to FIGS. 8, 9, a body A of the watercraft comprises a hull H and a deck D covering the hull H from above. A line at which the hull H and the deck D are connected over the entire perimeter thereof is called a gunnel line G. The gunnel line G is located above a waterline L of the watercraft.

As shown in FIG. 9, an opening 16, which has a substantially rectangular shape as seen from above is formed at a relatively rear section of the deck D in the upper portion of the body A. As shown in FIGS. 8, 9, a straddle-type seat S is mounted over the opening 16. The seat S has a proper width to permit the rider or passenger to easily straddle thereon.

An engine E is disposed in an engine room 20 surrounded by the hull H and the deck D below the seat S.

In this embodiment, the engine E is a four-cycle engine having multiple (for example, four) cylinders comprised of even cylinders. As shown in FIG. 8, an output end 26 of a crankshaft of the engine E is mounted along the longitudinal direction of the body A. The output end 26 of the crankshaft is rotatably coupled integrally with a pump shaft 21S of a water jet pump P through a propeller shaft 27. An impeller 21 is attached on the pump shaft 21S of the water jet pump P. The impeller 21 is covered with a pump casing 21C on the outer periphery thereof. A water intake 17 is provided on the bottom of the watercraft. The water is sucked from the water intake 17 and fed to the water jet pump P through a water intake passage. The water jet pump P pressurizes and accelerates the water by rotation of the impeller 21. The pressurized and accelerated water is discharged through a pump nozzle 21R having a cross-sectional area of flow gradually reduced rearward, and from an outlet port 21K provided on the rear end of the pump nozzle 21R, thereby obtaining a propulsion force.

In FIG. 8, reference numeral 21V denotes fairing vanes for fairing water flow behind the impeller 21. As shown in FIGS. 8, 9, reference numeral 24 denotes a bar-type steering handle. When the rider rotates the handle 24 clockwise or counterclockwise, the steering nozzle 18 behind the pump nozzle 21 R is swung toward the opposite direction via a cable 25 represented by a dashed line so that the watercraft can be correspondingly turned to any desired direction while the water jet pump P is generating the propulsion force.

As shown in FIG. 8, a bowl-shaped reverse deflector 19 is provided above the rear side of the steering nozzle 18 such that it can swing downward around a horizontally mounted swinging shaft 19a. The deflector 19 is swung downward to a lower position behind the steering nozzle 18 to deflect the ejected water from the steering nozzle 18 forward and, as the resulting reaction, the personal watercraft moves rearward.

In FIGS. 8, 9, reference numeral 22 denotes a rear deck. The rear deck 22 is provided with an openable rear hatch cover 29. A rear compartment (not shown) with a small capacity is provided under the rear hatch cover 29. In FIG. 8 or 9, reference numeral 23 denotes a front hatch cover. A front compartment (not shown) is provided under the front hatch cover 23 for storing equipments and the like.

Figure 1:
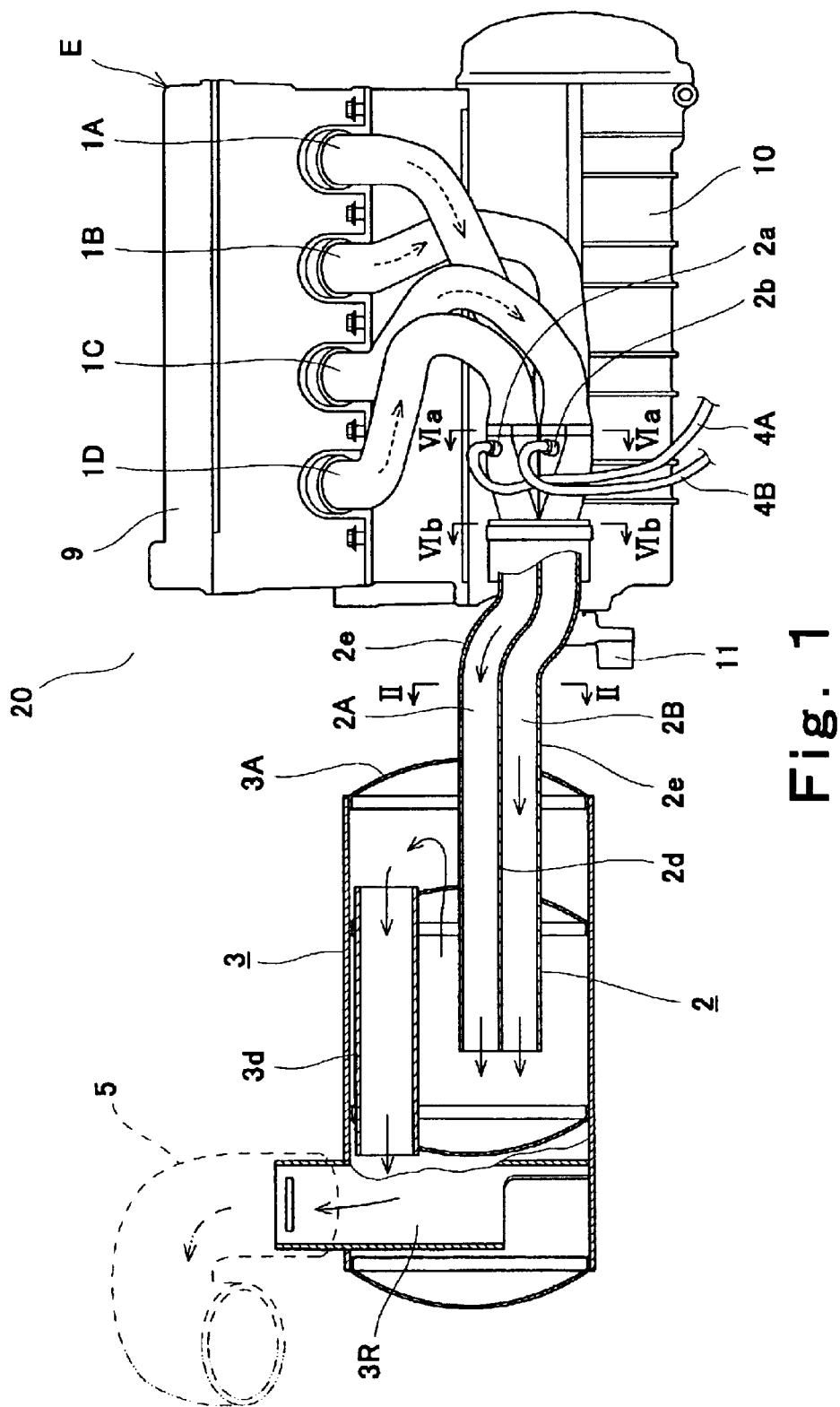
FIG. 1 is a partial cross-sectional side view, showing an arrangement of an engine contained in an engine room, and exhaust pipes, an exhaust muffler, and the like, which are mounted to the engine, in a personal watercraft according to an embodiment of the present invention.

In the personal watercraft according to this embodiment, the engine having an exhaust system in FIG. 1 is mounted in the engine room 20 surrounded by the hull H and the deck D in FIG. 8. More specifically, as shown in FIG. 1, cylinders of the engine E are respectively provided with exhaust pipes 1A, 1B, 1C, 1D such that base ends of these exhaust pipes are respectively connected to exhaust ports (not shown) of the respective cylinders.

The engine E is ignited in the order of a first cylinder to which the exhaust pipe 1A is connected, a third cylinder to which the exhaust pipe 1C is connected, a second cylinder to which the exhaust pipe 1B is connected, and a fourth cylinder to which the exhaust pipe 1D is connected. In brief, the engine E is ignited in the order of the first cylinder, the third cylinder, the second cylinder, and the fourth cylinder.

The exhaust pipe 1A of the first cylinder and the exhaust pipe 1D of the fourth cylinder which are ignited at successive timings are collected into a primary connecting exhaust pipe 2A placed downstream of the exhaust pipes 1A, 1D in an exhaust gas flow path. At least a rear end portion (for example, a rear half portion) of the primary connecting exhaust pipe 2A is accommodated in a water muffler 3 in which cooling water is supplied to the exhaust gas flowing through the inside. The exhaust pipe 1B of the second cylinder and the exhaust pipe 1C of the third cylinder which are ignited at successive timings are collected into a primary collecting exhaust pipe 2B placed downstream of the exhaust pipes 1B, 1C. At least rear end portion of the primary collecting exhaust pipe 2B is accommodated in the water muffler 3. In this embodiment, the water muffler 3 is a secondary collecting exhaust passage.

Figure 2A:
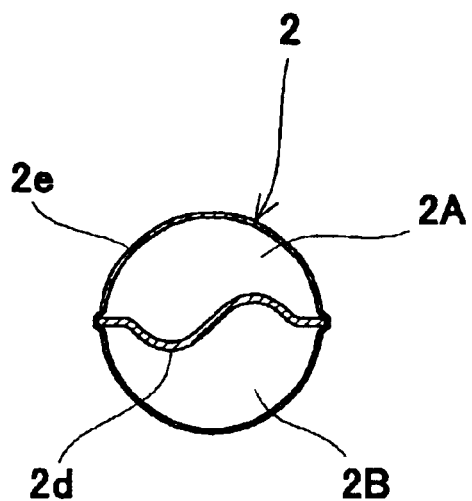
FIG. 2A is a cross-sectional view taken substantially along line II—II of FIG. 1, showing a cross-sectional structure of a primary collecting exhaust pipe shown in FIG. 1.

In this embodiment, as shown in FIG. 2A, the primary collecting exhaust pipes 2A, 2B constitute a pipe 2 circular in cross-section in such a way that the primary collecting exhaust pipes 2A, 2B are defined by a separating plate 2d in cross-section, and the separating plate 2d extends rearward along a pipe 2 to have a predetermined length. The separating plate 2d is configured to have a curvature, for example, a wave shape in cross-section in FIG. 2A and is adapted to absorb thermal distortion caused by thermal change.

Since the primary exhaust pipes 2A, 2B are formed in the form of one pipe, only a circular hole is formed in an end plate 3A of the water muffler 3 for inserting the primary collecting exhaust pipes.

In FIG. 1, inlet ports 2a, 2b are formed at front end portions of the primary collecting exhaust pipes 2A, 2B for supplying water to the inside of the primary collecting exhaust pipes 2A, 2B, respectively. Hoses 4A, 4B for supplying water are connected to the inlet ports 2a, 2b, respectively. Tip end portions of the hoses 4A, 4B are connected to positive-pressure portions (rear flow portions of the impeller 21) inside the water jet pump P to allow part of the pressurized water flowing through inside the water jet pump P to be supplied to the hoses 4A, 4B. Alternatively, water may be supplied from a cooling water supply pump or the like independently or exclusively provided.

The water muffler 3 is comprised of a plurality of chambers (expansion chamber or the like) which are connected to one another by means of a communicating pipe 3d, thus constituting a labyrinth structure. A resonator 3R is provided at a rear end portion (left end portion in FIG. 1) inside the water muffler 3. An exhaust gas is discharged from the resonator 3R outside the watercraft through an exhaust extension pipe 5.

In FIG. 1, reference numeral 9 denotes a cylinder head of the engine E, 10 denotes a crankcase of the engine E, 11 denotes one part forming a coupling attached to the output end 26 of the crankshaft of the engine E.

Figure 3:
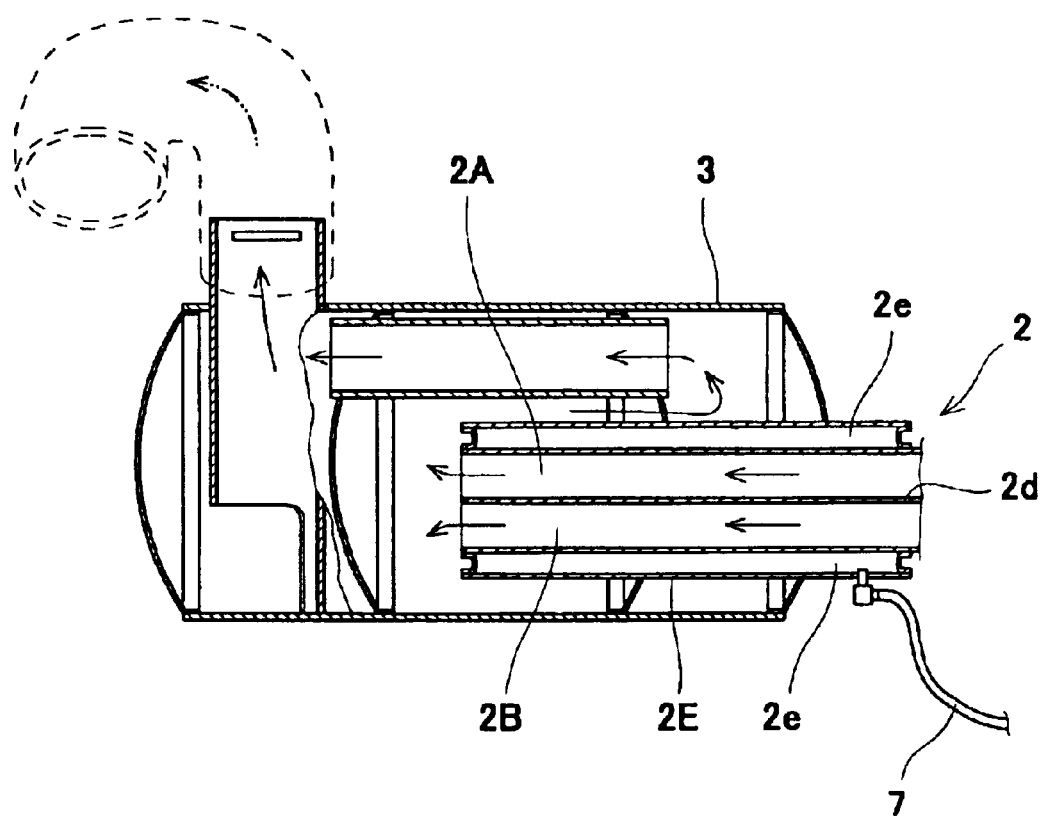
FIG. 3 is a partial cross-sectional side view of a water muffler portion, showing another structure of the primary collecting exhaust pipe.

Alternatively, as shown in FIG. 3, outer peripheries of the rear half portions of the primary collecting exhaust pipes 2A, 2B constituting the pipe 2 may be covered with an outer wall 2E to form a double-walled structure (water jacket), thereby obtaining so-called water cooling structure for supplying the cooling water from a cooling water supply hose 7 to an inner space 2e of the double-walled structure. This makes it possible that the temperature of the exhaust gas passing through the primary collecting exhaust pipes 2A, 2B can be lowered by the cooling water flowing through the inner space 2e. As a matter of course, the entire primary collecting exhaust pipes 2A, 2B may have the water-cooling structure.

Figure 4A:
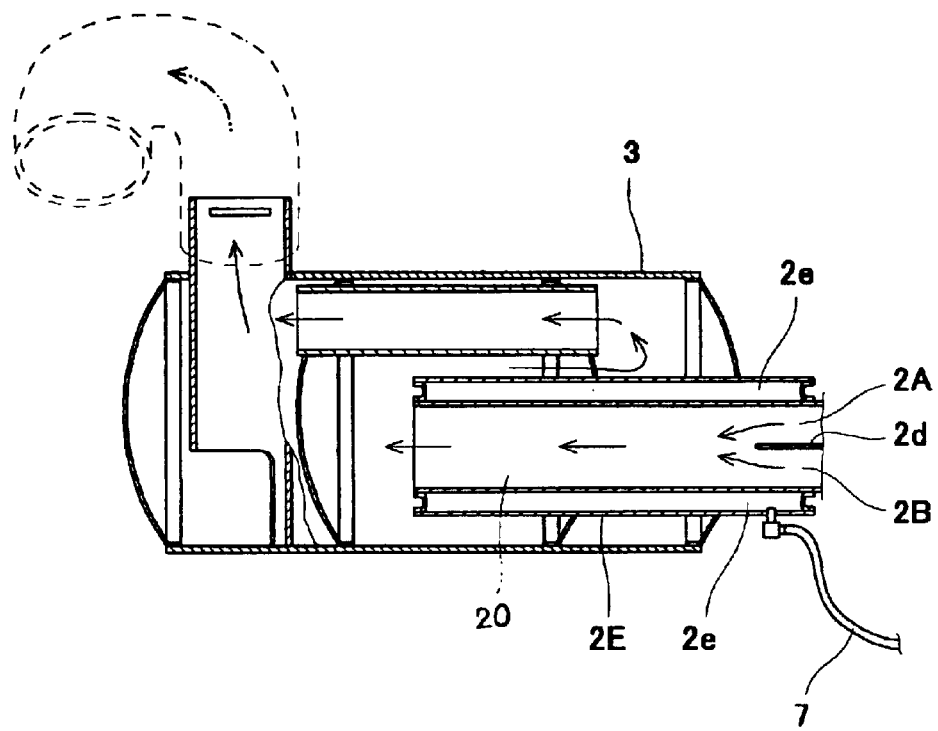
FIG. 4A is a partial cross-sectional side view showing another structure of the primary collecting exhaust pipe.
Figure 4B:
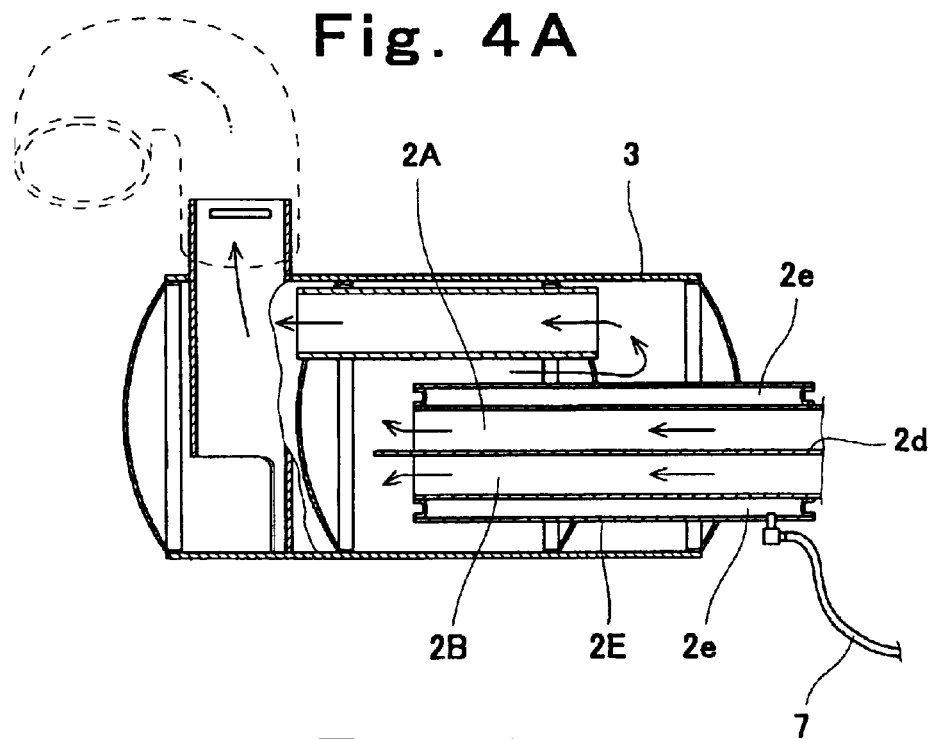
FIG. 4B is a partial cross-sectional side view showing another structure of the primary collecting exhaust pipe.

As shown in FIG. 4A, by setting the rear end of the separating plate 2d shorter than the rear end of a pipe 20 which connects the exhaust pipes 1A–1D to the water muffler 3, and by using a rear half portion of the pipe 20, a secondary collecting exhaust passage may be formed. Alternatively, as shown in FIG. 4B, the separating plate 2d may be extended rearward from the rear ends of the outer shell of the primary collecting exhaust pipes 2A, 2B to prevent the exhaust gases exiting from the outer shell of the primary collecting exhaust pipe 2A, 2B from interfering with each other in the vicinity of an exit.

Figure 2B:
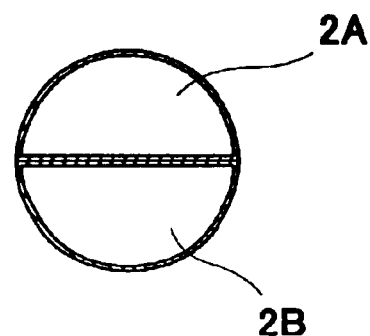
FIG. 2B is a cross-sectional view showing another structure of the primary collecting exhaust pipe.

Further, alternatively, as shown in FIG. 2B, the primary collecting exhaust pipes 2A, 2B may be comprised of independent semi-circular pipes.

Figure 5:
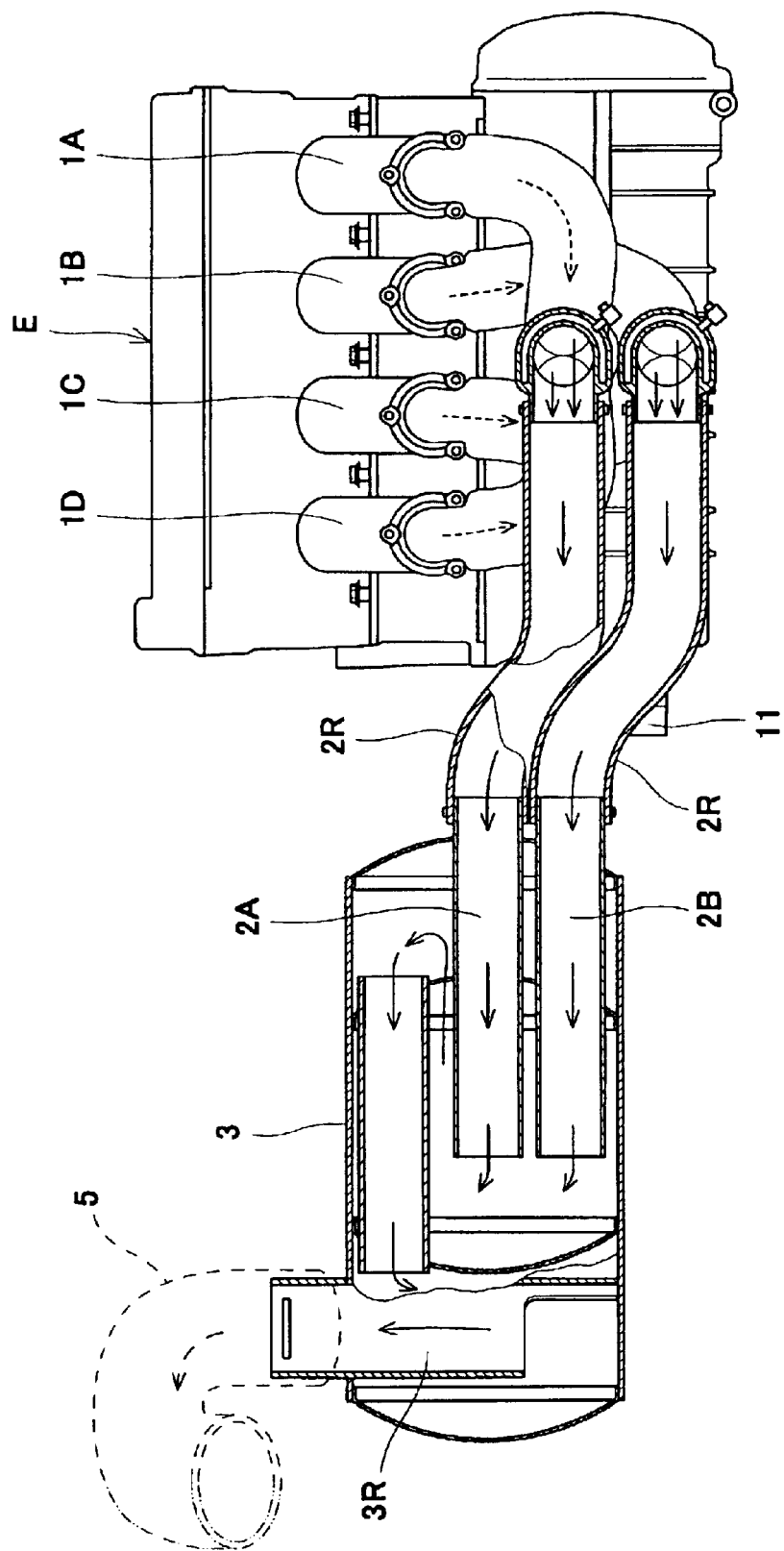
FIG. 5 is a partial cross-sectional side view, showing arrangement of an engine contained in an engine room, and exhaust pipes, an exhaust muffler, and the like which are mounted to the engine, in a personal watercraft according to another embodiment of the present invention.

Still further, alternatively, as shown in FIG. 5, the primary collecting exhaust pipes 2A, 2B may be comprised of independent pipes having circular cross-sections. In that case, part of each pipe is preferably comprised of a heat-resistant rubber pipe 2R. In this configuration, even when there is some deviation in the positional relationship between the engine E side and the water muffler 3, such deviation can be absorbed by flexibility of the rubber pipe 2R.

As shown in FIG. 5, in the case where the water muffler 3 is located higher than the bottom of the engine E and connected to the exhaust port of the engine E by means of an exhaust path having a portion located substantially as high as the bottom portion of the engine in the state in which the watercraft is in a steady state (including a stationary state), that is, the portion of the exhaust path is lower than the bottom portion of the water muffler 3 in the steady state of the watercraft, water ingress into a combustion chamber from the exhaust port (not shown) of the engine E can be prevented even if the watercraft is inverted and water enters into the muffler 3 through the exhaust extension pipe 5. In FIG. 5, the same reference numerals as those in FIG. 1 are used to identify the same or corresponding parts.

In the personal watercraft constituted as described above, the following functions and effects can be obtained.

In the case where the engine E is placed substantially at the center portion of the watercraft in the longitudinal direction as shown in FIGS. 8, 9, since at least rear end portions of the primary collecting exhaust pipes 2A, 2B, for example, the rear half portions are accommodated in the water muffler 3, the length of the primary connecting exhaust pipes 2A, 2B can be increased by the accommodated portions in the water muffler 3.

Since the inlet ports 2a, 2b are provided at the front end portions of the primary collecting exhaust pipes 2A, 2B for introducing water to the inside of the pipes 2A, 2B to thereby effectively lower the temperature of the exhaust gas, the effect provided by using pipes longer than the actually used pipes is achieved. Further, the engine E is capable of increasing a power even in a low engine speed by utilizing exhaust pulsation, as in a high engine speed.

In the exhaust system of the present invention, the increased power can be obtained without extending the length from the tip end of the engine E to the rear end of the water muffler 3. Therefore, the four-cycle engine with high horsepower can be mounted without the necessity of extending the total length of the personal watercraft.

As described with reference to FIG. 3, by providing the space 2e as the water jacket at the outer peripheries of the primary collecting exhaust pipe 2A, 2B, the temperature of the exhaust gas can be further lowered. With this structure, the engine E is capable of increasing the power even in the low engine speed by utilizing exhaust pulsation, as in the high speed engine.

While the four-cycle engine having four cylinders has been described in the above embodiment, the exhaust system of the present invention is applicable to any other four-cycle engine having even cylinders with pairs of cylinders.

While the muffler is the water muffler in the above embodiment, a muffler that does not introduce water may be employed.

Figure 6A:
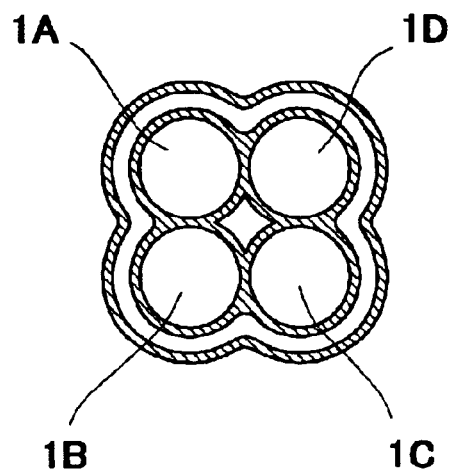
FIG. 6A is a cross-sectional view taken in the direction of arrows VIa—VIa in FIG. 1, showing an arrangement of exhaust passages.
Figure 6B:
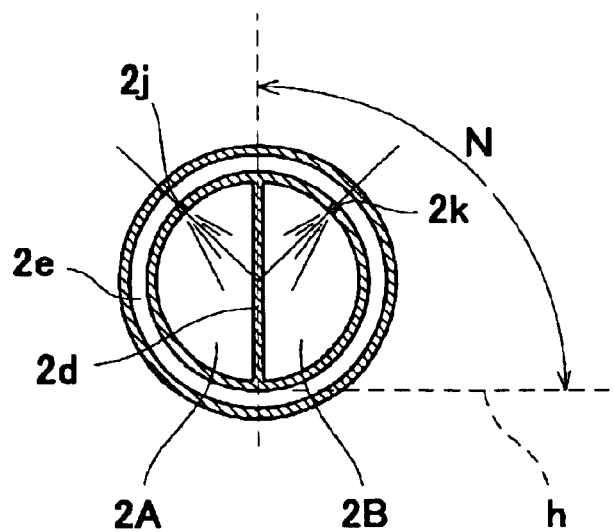
FIG. 6B is a cross-sectional view of a portion taken in the direction of arrows VIb—VIb in FIG. 1, showing the arrangement of the exhaust passages and a separating plate.
Figure 7:
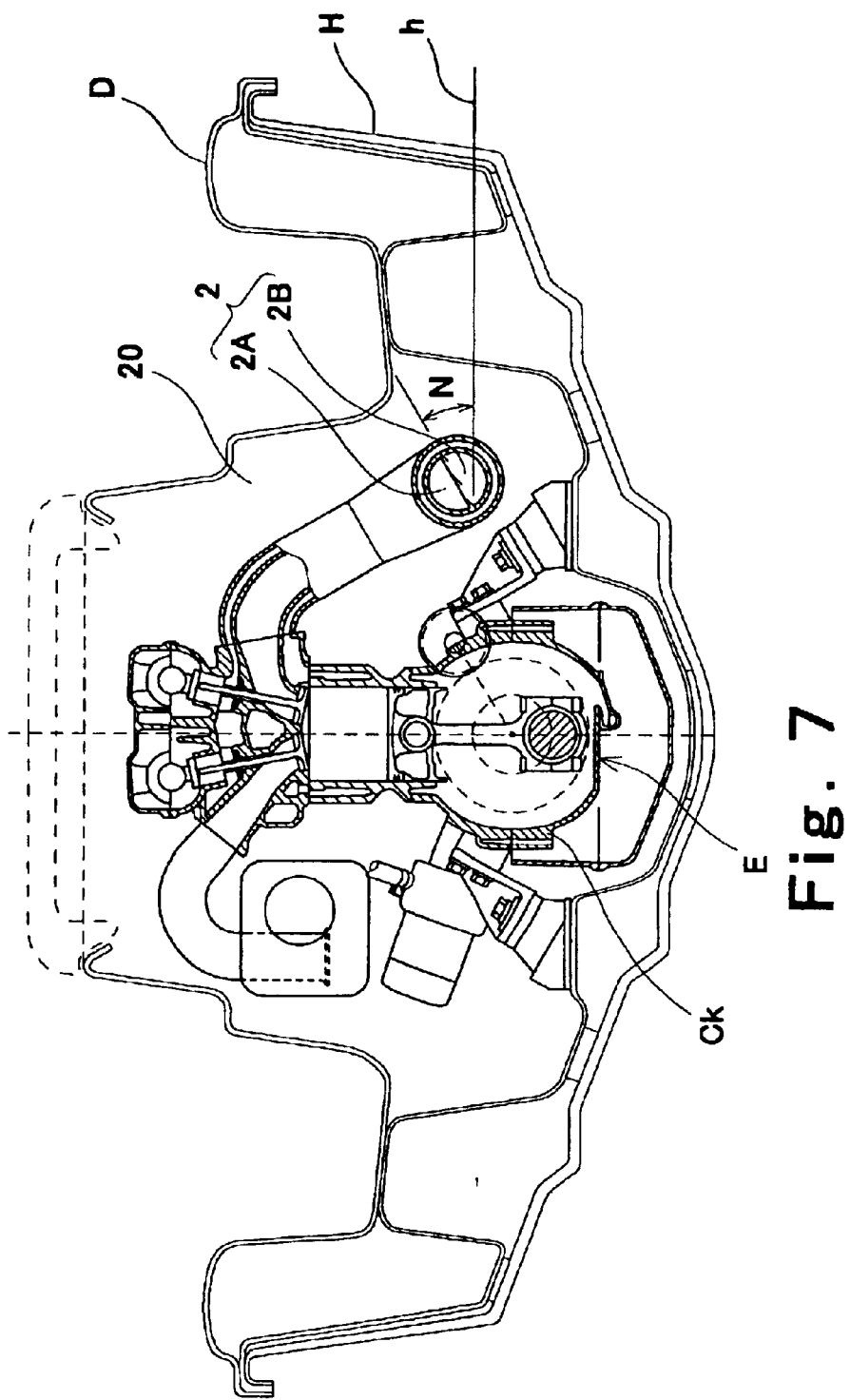
FIG. 7 is a transverse cross-sectional view showing the engine in FIG. 1 and an arrangement of the separating plate shown in FIG. 6B.

While the four exhaust passages 1A–1D in FIG. 6A are collected into the two primary collecting exhaust pipes 2A, 2B, the primary collecting exhaust pipes 2A, 2B are preferably structured as shown in FIG. 6B or FIG. 7. In the structure in FIGS. 3, 4A, 4B, the separating plate 2d for defining the primary collecting exhaust pipes 2A, 2B is hardly cooled by the cooling water supplied to the space (water jacket) 2e formed at the outer peripheries. On the other hand, in the structure in FIG. 6B, by forming the inlet ports 2j, 2k opened toward the separating plate 2d and supplying cooling water to the separating plate 2d through the inlet ports 2j, 2k, thermal load acting on the separating plate 2d can be reduced. The separating plate 2d is preferably placed to form an angle N with respect to a virtual horizontal line "h" in FIG. 7, because the cooling water is inevitably supplied to the separating plate 2d through the inlet port 2j (2k) positioned above the separating plate 2d. Here, the virtual horizontal line "h" represents the horizontal line in the steady state of the watercraft. In the most preferable configuration, as shown in FIG. 6B, the separating plate 2d is configured to be vertical, i.e., form 90 degrees with respect to the horizontal line h so that the cooling water is supplied to both sides of the separating plate 2d through the inlet ports 2j, 2k.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A personal watercraft adapted to eject water from an outlet port to be propelled as a resulting reaction, comprising:

a multi-cylinder four-cycle engine contained in an engine room and having even cylinders of four or more cylinders;

a water jet pump being driven by the engine, for pressurizing and accelerating the water;

exhaust passages respectively connected at front end portions to exhaust ports of the cylinder;

primary collecting exhaust passages connected to rear end portions of the exhaust passages, the primary collecting exhaust passages being each configured to collect two of the exhaust passages into one exhaust passage;

a secondary collecting exhaust passage into which the primary collecting exhaust passages are merged; and an inlet port configured to introduce water to an inside of the primary collecting exhaust passages, the inlet port being provided at a rear end portion of each of the exhaust passages or a front end portion of each of the primary collecting exhaust passages.

2. The personal watercraft according to claim 1, wherein a rear end portion of each of the primary collecting exhaust passages extends to the inside of the secondary collecting passage so as to be accommodated in the secondary collecting passage.

3. A personal watercraft adapted to eject water from an outlet port to be propelled as a resulting reaction, comprising:

a four-cycle engine contained in an engine room and having four cylinders;

a water jet pump being driven by the engine, for pressurizing and accelerating the water;

exhaust passages respectively connected to exhaust ports of the cylinders;

primary collecting exhaust passages each of which is configured to collect two exhaust passages into one exhaust passage; and a secondary collecting exhaust passage configured to collect the primary collecting exhaust passages, wherein each exhaust passage is an exhaust manifold through which an exhaust gas from the exhaust port of each cylinder flows to the primary collecting exhaust passage, wherein each primary collecting exhaust passage is comprised of a primary collecting exhaust pipe, and wherein the secondary collecting exhaust passage is a muffler comprising at least one expansion chamber.

4. The personal watercraft according to claim 3, wherein two primary collecting exhaust pipes have semi-circular cross sections which are joined to have a circular cross-section.

5. The personal watercraft according to claim 3, wherein two primary collecting exhaust pipes constitute one pipe having two independent passages defined by a separating plate having a curvature in cross-section.

6. The personal watercraft according to claim 3, wherein the muffler is a water muffler in which an exhaust gas containing supplied cooling water flows.

7. A small boat propelled by a multi-cylinder four-cycle engine disposed in an engine room of the boat, comprising:

a plurality of exhaust passages respectively connected at front end portions to exhaust ports of the engine;

at least two collecting exhaust passages, the collecting exhaust passages being connected to rear ends of the exhaust passages, the collecting exhaust passages being integral with each other and defined by a separating plate; and an inlet port configured to introduce water to an inside of the collecting exhaust passages, the inlet port being provided at a rear end portion of each of the exhaust passages or a front end portion of each of the collecting exhaust passages.

8. The small boat according to claim 7, wherein the inlet port is provided to allow water to be supplied to the separating plate through the inlet port.

9. The small boat according to claim 8, wherein the separating plate is provided so as to form an angle with respect to a horizontal line in a steady state of the small boat.

10. A personal watercraft adapted to eject water from an outlet port to be propelled as a resulting reaction, comprising:
  a multi-cylinder four-cycle engine contained in an engine room and having even cylinders of four or more cylinders;
  a water jet pump being driven by the engine, for pressuring and accelerating the water;
  exhaust passages respectively connected at front end portions to exhaust ports of the cylinders;
  primary collecting exhaust passages connected to rear end portions of the exhaust passages, the primary collecting exhaust passages being configured to collect two of the exhaust passages into one exhaust passage; and
  a secondary collecting exhaust passage into which the primary collecting exhaust passages are merged,
  wherein the rear end portion of each of the primary collecting exhaust passages is configured to protrude into an inside of the secondary collecting exhaust passage.

11. The personal watercraft according to claim 10, further comprising:
  an inlet port configured to introduce water to an inside of the primary collecting exhaust passages, the inlet port being provided at a rear end portion of each of the exhaust passages or a front end portion of each of the primary collecting exhaust passages.

* * * * *